United States Patent [19]

Gignoux et al.

[11] Patent Number: 4,574,387
[45] Date of Patent: Mar. 4, 1986

[54] APPARATUS AND METHOD FOR MEASURING THICKNESS

[75] Inventors: Dominique Gignoux, Bethesda; Russell Murray, Laurel, both of Md.

[73] Assignee: Data Measurement Corporation, Gaithersburg, Md.

[21] Appl. No.: 303,574

[22] Filed: Sep. 18, 1981

[51] Int. Cl.$^4$ ................ G01N 23/16; G01B 15/02
[52] U.S. Cl. .................................. 378/56; 250/358.1; 364/563
[58] Field of Search .............. 250/252.1, 358.1, 308, 250/359.1; 378/56, 54; 364/563

[56] References Cited

U.S. PATENT DOCUMENTS

| | | | |
|---|---|---|---|
| 3,334,231 | 8/1967 | Bernstein | 378/56 |
| 3,482,098 | 12/1969 | Mangan | 378/56 |
| 3,742,217 | 6/1973 | Eakman et al. | 378/56 |
| 3,757,122 | 9/1973 | Bossen et al. | 378/56 |
| 3,844,870 | 10/1974 | Donoghue et al. | 378/55 |
| 3,936,665 | 2/1976 | Donoghue | 364/563 |
| 4,009,376 | 2/1977 | Faraguet | 378/56 |
| 4,119,846 | 10/1978 | Outhwaite et al. | 250/252.1 |
| 4,155,009 | 5/1979 | Lieber et al. | 250/252.1 |
| 4,309,606 | 1/1982 | Björkman et al. | 378/56 |
| 4,510,577 | 4/1985 | Tsujii et al. | 378/54 |

FOREIGN PATENT DOCUMENTS 53-3262  1/1978  Japan .................. 250/358.1

Primary Examiner—Alfred E. Smith
Assistant Examiner—Carolyn E. Fields
Attorney, Agent, or Firm—Pollock, Vande Sande and Priddy

[57] ABSTRACT

This invention applies to thickness gauges consisting of a radiation source producing a beam aimed at a detector. Whenever a material to be gauged obstructs the radiation beam, the intensity received by the detector (detector output) varies and said variation can be translated into a thickness measurement. Standards are used for calibration. This invention provides computer means and methods that provide better measurements by using a function relating the thickness to the detector output in a large range and independently of random inaccuracies of the standards.

8 Claims, 4 Drawing Figures

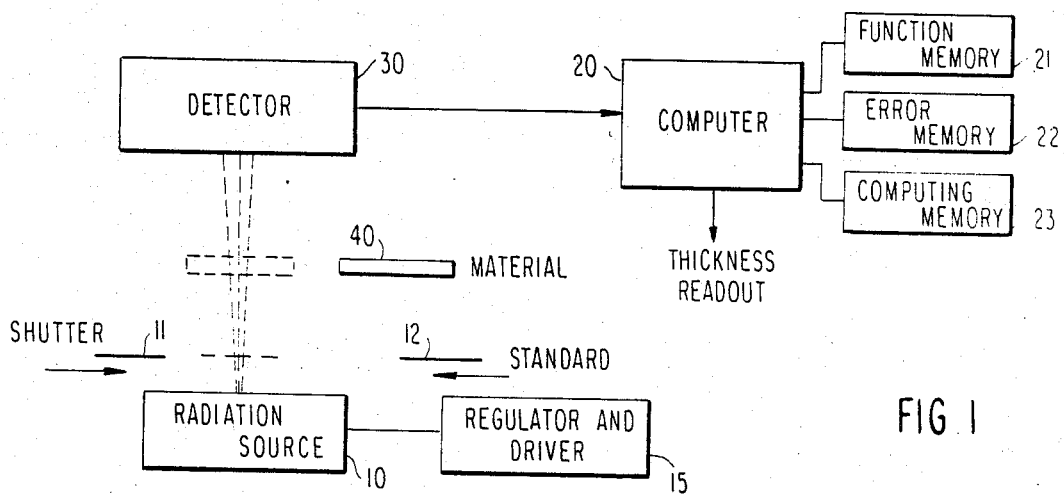
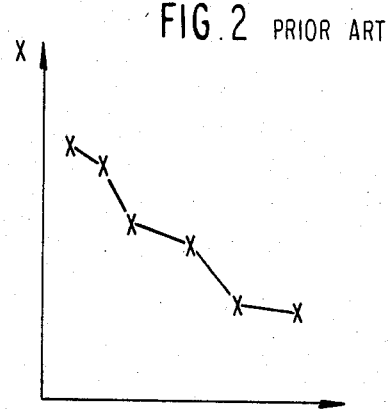
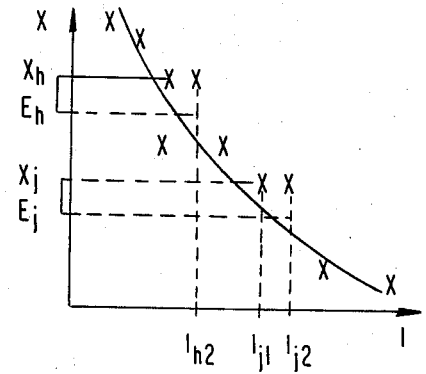
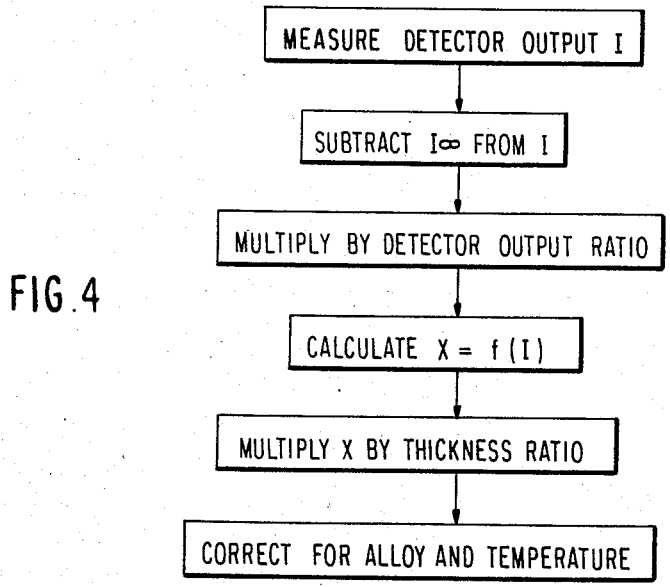

APPARATUS AND METHOD FOR MEASURING THICKNESS

This invention describes an improved apparatus of the type measuring the transmission of radiation through a material in generally flat or slightly curved form. In gauges of this type, as shown in FIG. 1, a beam of radiation is produced, for instance, by an x-ray source or a radioisotope material. The ratio of the initial beam intensity Io to the beam intensity remaining I after partial absorption by the material is directly related to the number of atoms of the material which are within the beam. From this number, the thickness of the material can be deduced and for this reason, the apparatus is generally referred to as a thickness gauge. This type of equipment is abundantly described in the literature and in particular in Section 18 "X-Ray and Isotope Gaging" of Nondestructive Testing Handbook, Ronald Press Co., New York.

Standards are used to calibrate the gauge. These are generally made of a reference metal of a known composition. The gauges of the prior art effect measurement about one particular value set as a nominal or target value and provide the measurement as a deviation from such nominal. For each nominal reading several parameters of source particle energy or controls within the detector are varied. A correction of the measurement is required when measuring material of a composition that is different from that of the standards. This correction will change whenever a source or detector parameter is changed requiring the establishment of a complete function or curve for composition correction.

Furthermore, in gauges of the prior art, each standard is considered as 100% accurate when, in practice, particularly the thin standards may contain random inaccuracies.

It is an object of the present invention to provide a gauging apparatus capable of measuring absolute thickness of material rather than relative to a nominal.

It is another object of the present invention to provide a gauge in which the effect of the random inaccuracies of each standard is removed.

It is a further object of the invention to provide a gauge in which composition correction can be effected simply by using one or at most a small number of correction factors.

BRIEF DESCRIPTION OF THE DRAWINGS

FIG. 1 is a block diagram of a radiation thickness gauge of the type used in the invention.

FIG. 2 is a graph showing the thickness versus detector output relationship as determined from standards in gauges of the prior art.

FIG. 3 is a graph showing the thickness versus detector output points corresponding to the standards, a curve fitted through these points and two points, utilized in calibration procedures in accordance with the present invention.

FIG. 4 is a flow chart showing the successive operations accomplished by the microcomputer used in the present invention starting with a detector output and ending with a thickness measurement.

The preferred embodiment of the invention is shown on FIG. 1. A radiation source (10) which may be a radioisotope or an x-ray source produces a beam of radiation which is aimed at a radiation detector (30). The radiation detector may consist of a scintillation crystal and a photomultiplier tube or an ionization chamber as described in "Radiation Detector and Measurement" by Glenn F. Knoll, John Wiley & Sons. The detector may also contain amplifiers capable of providing a suitable electrical signal or detector output. A shutter (11) may be placed in the beam to totally obstruct the beam. Also, a standard (12) or several standards can be placed in the beam on demand, as is the material to be measured (40). The detector (30) is connected to a computer (20) to which are associated function memory (21), error memory (22), and computing member (23).

The detector output is related to the thickness of the material so that the detector output is translated into a thickness by the computer.

In some of the gauges of the prior art, the function representing the thickness X versus detector output I is obtained by inserting in the radiation beam a number of standards such that these standards combinations can represent a number of thicknesses within the range of the gauge. A series of points can then be obtained as shown on FIG. 2. In some of the prior art the X versus I function is obtained by fitting a curve through two or three points and then effecting the translation of I into X by interpolation. This results, in effect, in using the standards to support the full function as shown on FIG. 2 where, for the sake of clarity, only a few combinations of standards are shown. One of the problems encountered is that the curve shown on FIG. 2 is not smooth because it is influenced by the inaccuracies of each of the standards. The present invention provides a means of obtaining a thickness function $X = f(I)$ which is independent of the random inaccuracies of standard combinations. It also permits updating and calibrating of said thickness function as required and performing material composition corrections.

The method of the invention is illustrated in FIG. 3 which displays the data obtained using a number of standard combinations, such number being preferably not substantially less than twenty. These combinations may include infinity as obtained by the shutter and zero as obtained by placing no standard in the beam. The function is obtained by using one of the several averaging or curve fitting approximations available in digital computer programs and resulting in a "best-fit" function being expressed as a polynomial. Such methods are described in various textbooks and in particular "Numerical Methods for Scientists and Engineers", by Hamming, McGraw Hill.

The program also makes it possible to store the error $E_j$ corresponding to the standard combination $X_j$ or $E_h$ for standard $X_h$. It is also possible in such approximation to assign greater weight to data points that have a lesser likelihood of error. This can be accomplished by assigning weight 2 to the point corresponding to thickness zero and weight 1 to all other points. One of the standard combinations which may be used is the one corresponding to zero thickness; that is, no standard in the beam. Another combination is the one corresponding to infinite thickness obtained by means of a lead shutter.

It may be that the total range of thickness may result in radiation intensities which exceed the range in which the detector can operate. In this case, if the source of radiation is an x-ray source, its voltage will not stay fixed but will be set at one of several constant voltages each for a certain range of thickness. In this case, there will be one thickness function as described above for each range. Total number of ranges is generally less than ten.

The "best fit" operation described above requires placing a number of standard combinations in the beam. For this reason, it requires more than 10 seconds and generally several tens of seconds to accomplish. To correct for drifts that may occur, a gauge according to the invention is capable of any or all of the calibration mechanisms described below and shown in the typical flow chart of FIG. 4.

(A) The first correction is based on the fact that the detector output I should be zero when the thickness X is very large. This is obtained by obstructing temporarily the beam with the lead shutter, measuring the corresponding value of I, which we will call $I\sqrt{}$ and thereafter subtract $I\sqrt{}$ from all measurements of I.

(B) The second correction (see FIG. 3) consists of taking one data point Xj. Due to drift, the value of I is not the same as the value of $Ij_1$ which was obtained at the time of determination of the thickness function but a new value $Ij_2$. A detector output ratio $R = Ij_2/Ij_1$ is then obtained and the thickness function $X = f(I)$ is replaced by the updated function $X = f(RI)$.

(C) An additional correction (see FIG. 3) for drift, which is another object of this invention, consists of taking a second data point for which the suffix h is used in the place of the suffix j and replacing the thickness function by the updated function:

$$X = \frac{X_h - E_h}{f(I_{h2})} f(I)$$

in which the multiplier applied to f(I) is called the thickness ratio.

Clearly the action of storing a function (or several functions covering all ranges of the gauge) together with the errors of the standards makes it possible to perform gauging measurements without being influenced by the random inaccuracies of the standards. It also makes possible calibrating and updating by B or C above using only one combination of standards.

An advantage of the invention is that it gives the thickness gauge operator the ability to accomplish the calibration or updating operations A, B, C above in the order best suited to the circumstances. By way of illustration, it can be said that if the operator suspects a detector drift, A is recommended. For a change in gauge geometry, for instance, in distance from source to detector, B is suitable. For a drift in source voltage, C is recommended.

The measurement procedure described above is only valid for a gauge measuring the same material as that of which the standards are made. In general, this is not the case. When the gauge is used in the metal industry, for instance, the metal measured may be a different alloy than that of the standard. In that case, an alloy number K is used to correct the function as follows:

$$X = Kf(I)$$

One factor K per alloy per voltage range need be stored. Similarly, when the metal measured is hot, the measurements obtained need to be multiplied by a temperature correction factor. In some cases, this may be combined with the alloy or composition factor into a single correction factor.

In the preferred embodiment of the invention, the operations described above are accomplished by a computer which is preferably a microcomputer consisting of a chip and auxiliary equipment.

What is claimed is:

1. A radiation thickness gauge comprising:
    a radiation source;
    a radiation detector spaced from said source and located in the beam emitted by said source, said detector comprising means translating the intensity of the radiation received by the detector into an electrical signal output;
    a first path extending through the space between said source and detector for the passage of a material whose thickness is to be measured;
    a second path in said space, parallel to said first path, for introducing one of several standards of known thickness of reference material on demand;
    shutter means of radiation absorbing material movable into said space to absorb the beam upon command;
    means for recording several values of detector outputs corresponding to several combinations of standards, and computer means comprising means for determining a thickness function that best fits the relationship between the recorded values of standards thicknesses and corresponding detector outputs and recording said function as a relationship between thickness and detector output;
    said computer means further comprising means for determining a value of thickness of the material to be measured by applying said thickness function to the detector output when the material whose thickness is to be measured is in the beam;
    memory means for storing as errors the difference between the known thickness of each standard combination and the thickness obtained by calculation by applying said thickness function to the detector output obtained by placing said standard combination in the radiation beam; and
    said computer means further comprising means for correcting detector outputs by:
    1. calculating a thickness ratio as a function having as a numerator the known thickness of a standard combination minus the recorded error of said standard combination and having as a denominator the thickness as obtained by measuring the standard combination while using a previously stored thickness function; and
    2. updating the thickness function by multiplying the previously stored function by said thickness ratio.

2. A gauge as defined in claim 1 in which said combinations of standards includes an empty space representative of zero thickness.

3. A gauge as defined in claim 2 in which the computer means determines the thickness function by use of a best fit statistical method in which the point corresponding to zero thickness is counted a plurality of times.

4. A gauge as defined in claim 1 in which the radiation source consists of a radioisotope.

5. A gauge as defined in claim 1 in which the radiation source consists of an x-ray source.

6. A gauge as defined in claim 5 in which the x-ray source is operated at a number of fixed voltages, the computer means being operative to determine a different thickness function for each of said voltages.

7. A gauge as defined in claim 6 with additional means for:
    multiplying the value of thickness obtained from the updated thickness function by a number which effects composition compensation and temperature compensation.

8. A gauge as defined in claim 1 in which said computer means is a microcomputer.

* * * * *